UNITED STATES PATENT OFFICE.

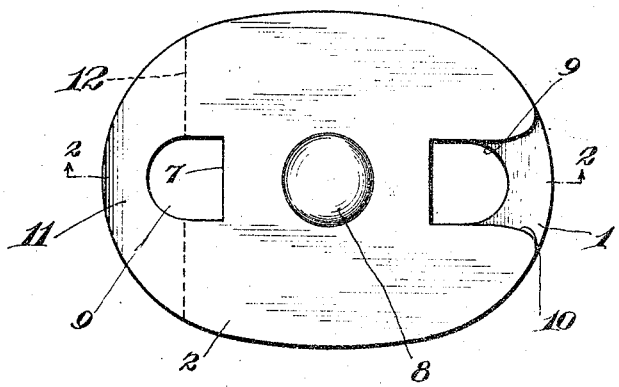
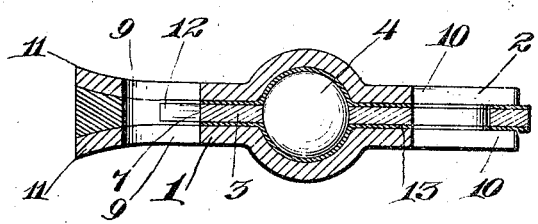
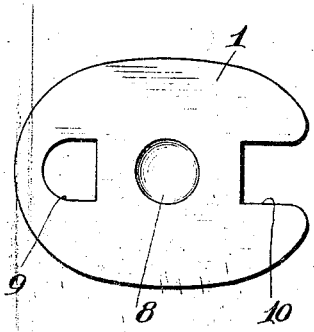 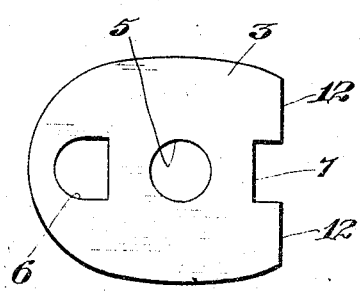 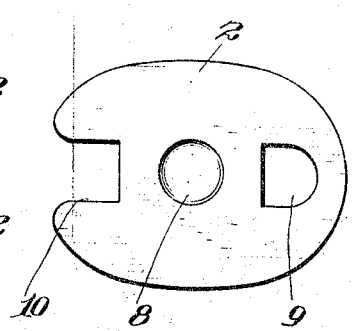

WILLIAM W. HAWKINS AND JOHN M. DUNCAN, OF PHILADELPHIA, PENNSYLVANIA.

FUSIBLE LINK.

1,191,919. Specification of Letters Patent. Patented July 18, 1916.

Application filed November 13, 1915. Serial No. 61,216.

*To all whom it may concern:*

Be it known that we, WILLIAM W. HAWKINS and JOHN M. DUNCAN, citizens of the United States, residing at Philadelphia, in the county of Philadelphia and State of Pennsylvania, have invented certain new and useful Improvements in Fusible Links, of which the following is a specification.

Our invention relates to improvements in fusible links, and more particularly to a fusible link designed for use in connection with automatic sprinklers, the object of the invention being to provide a fusible link in which a ball or other rolling member acts as a cam to force the elements of the link apart, and insure a perfect operation.

A further object is to provide a link of the character stated which can be manufactured and sold at a reasonably low price, and which will be sufficiently strong to withstand all the necessary tension of the apparatus, yet quickly operate when subjected to a pre-determined temperature.

With these and other objects in view, the invention consists in certain novel features of construction and combinations and arrangements of parts as will be more fully hereinafter described and pointed out in the claims.

In the accompanying drawings: Figure 1 is a plan view illustrating our improved fusible link. Fig. 2 is a view in longitudinal section on the line 2—2 of Fig. 1, and Figs. 3, 4, and 5, are plan views of the three link elements.

1 and 2 represent the outside elements, and 3 the intermediate element of our improved fusible link, a ball 4 operating to couple the elements together as will hereinafter appear. The elements 1, 2, and 3, are preferably stamped from sheet metal or they may be formed in any other manner which will produce the shapes desired. The intermediate member 3 is provided with a central opening 5. It is also provided with an eye 6 adjacent one end, and with a recess 7 in its opposite end. The links 1 and 3 are constructed precisely alike. They are each provided with a central spherical socket 8, and with an eye 9 adjacent one end, and a recess 10 at their other ends.

In assembling the link, the ball 4 is located through the opening 5 in element 3, and projects into the sockets 8 in the elements 1 and 2. The elements 1 and 2 are positioned with their eyes 9 and recesses 10 in alinement, and the element 3 is positioned with its eye 6 registering with the recesses 10 and its recess 7 registering with the eyes 9 of elements 1 and 2. It will be noted that the ends of elements 1 and 2 adjacent the eyes 9 are curved or flared slightly apart as shown at 11, and it will also be noted that the end 12 of element 3 terminates an appreciable distance short of the ends of elements 1 and 2, and operates as a fulcrum to assist the ball 4 in separating the elements as will more fully hereinafter appear. A filling of solder 13 is provided between the elements and around the ball as shown clearly in Fig. 2, and this solder is of the fusible kind which melts at a desired temperature to release the elements as will be understood.

When the parts are assembled as shown, the ball 4 with the aid of the solder 13 securely couples the elements of the link together so as to withstand any strain or tension to which the device is put.

When the solder is melted by the flame or heat, the tension on the elements 1, 2, and 3, causes the curved surfaces of the socket 8 to ride on the curved surfaces of the ball 4 as the element 3 is drawn in a direction opposite to the direction of movement of the elements 1 and 2. The ball, therefore, by reason of its cam action, throws the elements 1 and 2 away from element 3, thus quickly separating the elements, and allowing the automatic sprinkler to which it is connected to operate.

As above stated, the flared ends 11 facilitate this separation of the elements as they fulcrum on the end 12 of element 3, and we therefore can utilize this additional tendency to separate the elements as well as the cam action of the ball.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A fusible link, comprising three plates located side by side and soldered together, the outside plates having registering openings at one end of the link; the intermediate plate having an opening at the other end of the link, and a ball coupling the three plates together and tending to force the outside plates away from the intermediate plate when the plates are moved longitudinally relative to each other, substantially as described.

2. A fusible link, comprising three plates located side by side and soldered together, the outside plates having registering openings at one end of the link, the intermediate plate having an opening at the other end of the link, said intermediate plate having an opening therein, said outside plates having sockets registering with the opening, and a ball in said opening and sockets, substantially as described.

3. A fusible link consisting of three elements held together by fusible solder, the intermediate element having an opening therein, the outside elements having sockets therein, and a ball projecting through the opening and into both sockets, substantially as described.

4. A fusible link comprising three plates located side by side, and said plates held together by fusible solder, the intermediate plate having a central opening, the outside plates having central sockets, and a ball projecting through the opening and into both sockets, substantially as described.

5. A fusible link, comprising three plates located side by side, the intermediate plate having an opening therein, the outside plates having sockets therein, a ball located in the opening and projecting into both of said sockets, and fusible solder interposed between the links and between the ball and the outside links, substantially as described.

6. A fusible link, comprising three plates located side by side, the intermediate plate having an opening therein, the outside plates having sockets therein, a ball located in the opening and projecting into both of said sockets, fusible solder interposed between the links and between the ball and the outside links, the outside links having eyes at one end and recesses in their other ends, the intermediate link having an eye at one end registering with the recesses in the outside links, and having a recess at its other end registering with the eyes in the outer links, said intermediate link at its recessed end terminating short of the ends of the outer links which have the eyes therein, substantially as described.

7. A fusible link, comprising three plates located side by side, the intermediate plate having an opening therein, the outside plates having sockets therein, a ball located in the opening and projecting into both of said sockets, fusible solder interposed between the links and between the ball and the outside links, the outside links having eyes at one end and recesses in their other ends, the intermediate link having an eye at one end registering with the recesses in the outside links, and having a recess at its other end registering with the eyes in the outer links, said intermediate link at its recessed end terminating short of the ends of the outer links which have the eyes therein, said outer links at their eye ends flared apart, substantially as described.

In testimony whereof we have signed our names to this specification in the presence of two subscribing witnesses.

WILLIAM W. HAWKINS.
JOHN M. DUNCAN.

Witnesses:
C. R. ZIEGLER,
S. W. FOSTER.